United States Patent
Shao et al.

(10) Patent No.: US 9,436,283 B2
(45) Date of Patent: Sep. 6, 2016

(54) ELECTRONIC APPARATUS AND ELECTRONIC SYSTEM

(71) Applicants: Beijing Lenovo Software Ltd., Haidian District, Beijing (CN); Lenovo (Beijing) Co., Ltd., Haidian District, Beijing (CN)

(72) Inventors: Xiang Shao, Beijing (CN); Rongyao Fu, Beijing (CN); Jinping Yang, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 195 days.

(21) Appl. No.: 14/097,792

(22) Filed: Dec. 5, 2013

(65) Prior Publication Data

US 2014/0160069 A1 Jun. 12, 2014

(30) Foreign Application Priority Data

Dec. 6, 2012 (CN) .......................... 2012 1 0520946

(51) Int. Cl.
| | |
|---|---|
| *G09G 5/00* | (2006.01) |
| *G06F 3/01* | (2006.01) |
| *G06F 3/044* | (2006.01) |
| *G06F 1/16* | (2006.01) |
| *G06F 3/041* | (2006.01) |

(52) U.S. Cl.
CPC ............ *G06F 3/016* (2013.01); *G06F 1/169* (2013.01); *G06F 1/1643* (2013.01); *G06F 3/044* (2013.01); *G06F 3/0416* (2013.01)

(58) Field of Classification Search
CPC ............. G06F 1/203; G06F 2200/201; G06F 19/321; G06F 17/30442; G06F 1/169; G06F 3/016; G06F 3/0416; G06F 3/044; G06F 2203/04104; G06F 3/03545; G06F 3/0488; G06F 1/1632; G06F 1/3262; G06F 3/03547; G06F 13/4022; G06F 13/4068; G06F 13/409; G06F 1/1643; G06F 1/1698
USPC ................................. 345/173–181, 169, 156
See application file for complete search history.

(56) References Cited

U.S. PATENT DOCUMENTS

| | | | |
|---|---|---|---|
| 2012/0188176 A1 | 7/2012 | Uzelac | |
| 2012/0191394 A1* | 7/2012 | Uzelac | ............... G06F 3/044 702/79 |

FOREIGN PATENT DOCUMENTS

| | | |
|---|---|---|
| CN | 101281436 | 10/2008 |
| CN | 102799117 | 11/2012 |

OTHER PUBLICATIONS

First Office Action dated May 5, 2016 out of Chinese priority Application No. 201210520946.1 (11 pages including English translation).

*Primary Examiner* — Duc Dinh
(74) *Attorney, Agent, or Firm* — Brinks Gilson & Lione; G. Peter Nichols

(57) ABSTRACT

The present invention provides an electronic apparatus and an electronic system. The electronic apparatus includes: at least one programmable electric conductive unit configured to switch a good conductor mode and a normal conductor mode according to a control signal when it contacts with a second electronic apparatus so as to transmit predetermined information to the second electronic apparatus contacting with the electronic apparatus; a control unit configured generate the control signal having a predetermined frequency; and a feedback information receiving unit configured to receive feedback information transmitted by the second electronic apparatus, the feedback information being transmitted in response to the reception of the predetermined information.

14 Claims, 3 Drawing Sheets

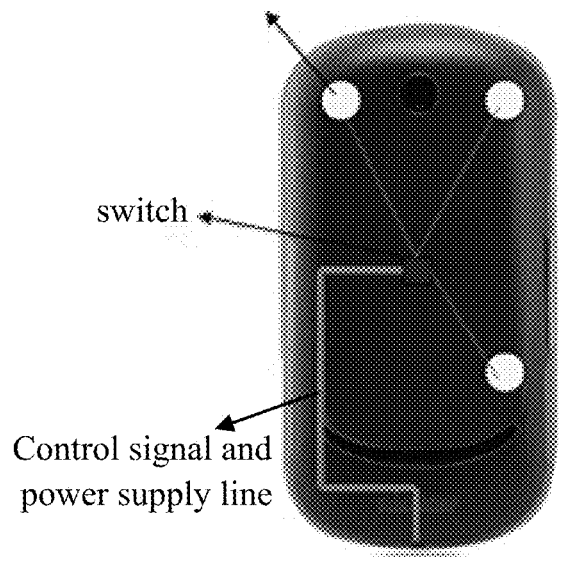
Figure 3A    Figure 3B
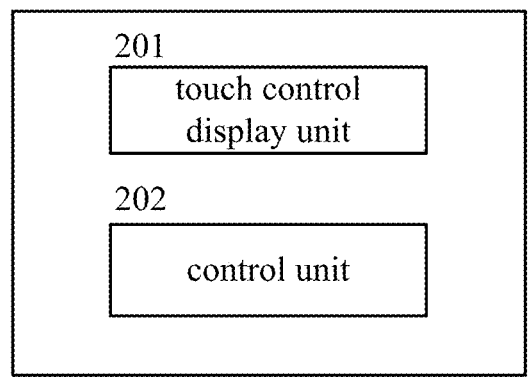
Figure 4

ELECTRONIC APPARATUS AND ELECTRONIC SYSTEM

BACKGROUND

This application claims priority to Chinese patent application No. 201210520946.1 filed on Dec. 6, 2012, the entire contents of which are incorporated herein by reference.

The present invention relates to the field of electronic apparatus.

In recent years, the touch control display screen has been widely applied in various kinds of electronic apparatuses, such as a tablet computer, a mobile phone, a large screen oneness machine or the like. Further, with the development of the operating system, touch control operation has become one of the most important interactive modes. In various kinds of touch control display screen, capacitive touch control screen is the most important kind of the touch control display screen now.

The capacitive touch control screen has the following characteristic: when a conductor with normal electric conductive performance is made to contact with the touch control screen, the capacitive touch control screen may not respond, but when a good conductor is made to further contact with the normal conductor, the capacitive touch control screen will explode point to generate response.

In this regard, it is desired to provide an electronic apparatus and an electronic system which are able to interact with the capacitive touch control screen effectively according to the characteristic of the capacitive touch control screen so as to give the user a good usage experience.

SUMMARY

According to one aspect of the present invention, there provides an electronic apparatus, comprising:

At least one programmable electric conductive unit configured to switch between a good conductor mode and a normal conductor mode according to a control signal when it contacts with a second electronic apparatus, so as to transmit predetermined information to the second electronic apparatus contacting with the electronic apparatus;

A control unit configured to generate the control signal having a preset frequency;

A feedback information receiving unit configured to receive feedback information transmitted from the second electronic apparatus, the feedback information being transmitted in response to reception of the predetermined information.

Preferably, the at least one programmable electric conductive unit includes:

A good conductor;

A normal conductor configured to contact with the second electronic apparatus;

A switch, which turns on the good conductor or the normal conductor according to the control signal so as to switch between the good conductor mode and the normal conductor mode.

Preferably, the predetermined information includes apparatus information related to the electronic apparatus, the apparatus information including one or more of the following:

An apparatus identifier;

Type and model information of the apparatus;

Type and model information of the feedback information receiving unit; and/or

Relative position information of the programmable electric conductive unit and the feedback information receiving unit.

Preferably, a relative position of the programmable electric conductive unit and the feedback information receiving unit is fixed.

Preferably, the feedback information receiving unit is further configured to analyze the received feedback information to confirm whether the second electronic apparatus has successfully received the predetermined information.

Preferably, the feedback information receiving unit is an image acquiring unit, and the feedback information includes visual information.

Preferably, when the visual information is a color, successful reception of the predetermined information is indicated by a first color, and unsuccessful reception of the predetermined information is indicated by a second color; or When the visual information is a graph, successful reception of the predetermined information is indicated by a first graph, and unsuccessful reception of the predetermined information is indicated by a second graph; or When the visual information is an image, successful reception of the predetermined information is indicated by a first predetermined image, and unsuccessful reception of the predetermined information is indicated by a second predetermined image; or When the visual information is a character, by executing a recognition process on the character in the feedback information, successful or unsuccessful reception of the predetermined information is confirmed according to the recognized character content.

Preferably, the feedback information receiving unit is an acoustic sensor, and the feedback information includes voice information.

Preferably, by executing recognition process on the voice information, successful or unsuccessful reception of the predetermined information is confirmed according to the recognized voice content.

According to another aspect of the present invention, there provides an electronic apparatus, comprising:

A touch control display unit configured to receive predetermined information inputted from a second electronic apparatus when it contacts with the second electronic apparatus, the second electronic apparatus transmitting the predetermined information by switching between a good conductor mode and a normal conductor mode;

A control unit configured to generate feedback information according to the predetermined information, and control the touch control display unit to provide the feedback information to the second electronic apparatus.

Preferably, the predetermined information includes apparatus information related to the second electronic apparatus, the apparatus information including one or more of the following:

An apparatus identifier;

Type and model information of the apparatus;

Type and model information of a feedback information receiving unit; and/or

Relative position information of a programmable electric conductive unit and the feedback information receiving unit.

Preferably, the control unit is further configured to detect a position of a contact point contacting with the second electronic apparatus, and determine a position of providing the feedback information to the second electronic apparatus according to a result of detection and the relative position information of the programmable electric conductive unit and the feedback information receiving unit included in the apparatus information.

Preferably, the touch control display unit is a capacitive touch control display unit.

According to yet another aspect of the present invention, there provides an electronic system, comprising:

A first electronic apparatus, including:

At least one programmable electric conductive unit configured to switch between a good conductor mode and a normal conductor mode according to a control signal when it contacts with a second electronic apparatus, so as to transmit predetermined information to the second electronic apparatus contacting with the first electronic apparatus;

A control unit configured to generate the control signal having a preset frequency;

A feedback information receiving unit configured to receive feedback information transmitted from the second electronic apparatus, the feedback information being transmitted in response to reception of the predetermined information.

The second electronic apparatus, including:

A touch control display unit configured to receive the predetermined information inputted from the first electronic apparatus when it contacts with the first electronic apparatus;

A control unit configured to generate feedback information according to the predetermined information, and control the touch control display unit to provide the feedback information to the first electronic apparatus.

Therefore, using the electronic apparatus and electronic system according to the embodiments of the present invention, it is able to interact with the capacitive touch control screen effectively according to the characteristic of the capacitive touch control screen so as to give the user a good usage experience.

BRIEF DESCRIPTION OF THE DRAWINGS

FIG. 3A illustrates a back view of the electronic apparatus according to the first embodiment of the present invention;

FIG. 3B illustrates a front view of the electronic apparatus according to the first embodiment of the present invention.

FIG. 4 is a functional block diagram of an electronic apparatus according to a second embodiment of the present invention;

DETAILED DESCRIPTION

The electronic apparatus and electronic system according to the embodiments of the present invention will be described with reference to the accompanying drawings as follows.

The First Embodiment

Figure 1:
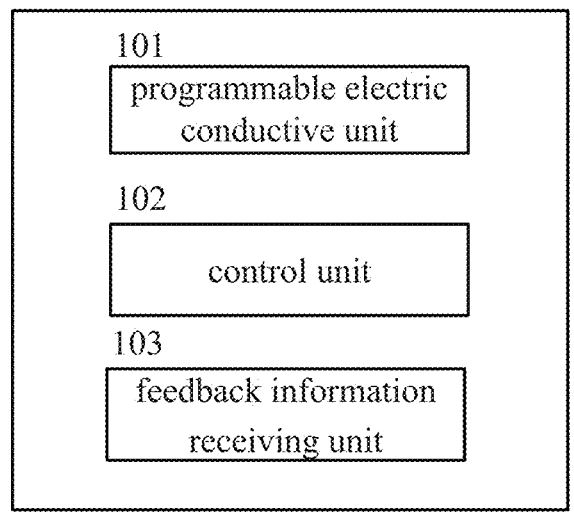
FIG. 1 is a functional block diagram of an electronic apparatus according to a first embodiment of the present invention.

FIG. 1 is a functional block diagram of an electronic apparatus 100 according to the first embodiment of the present invention. In this embodiment, it is described by taking the mobile phone being the electronic apparatus 100 as an example, it should be understood that the electronic apparatus 100 may be any type of electronic apparatus.

As shown in FIG. 1, the electronic apparatus 100 according to the first embodiment of the present invention includes at least one programmable electric conductive unit 101, a control unit 102 and a feedback information receiving unit 103.

The programmable electric conductive unit 101 is configured to switch between a good conductor mode and a normal conductor mode according to a control signal when it contacts with a second electronic apparatus so as to transmit predetermined information to the second electronic apparatus contacting with the electronic apparatus.

The control unit 102 is configured to generate the control signal having a predetermined frequency.

The feedback information receiving unit 103 is configured to receive feedback information transmitted from the second electronic apparatus, and the feedback information is transmitted in response to reception of the predetermined information.

Figure 2:
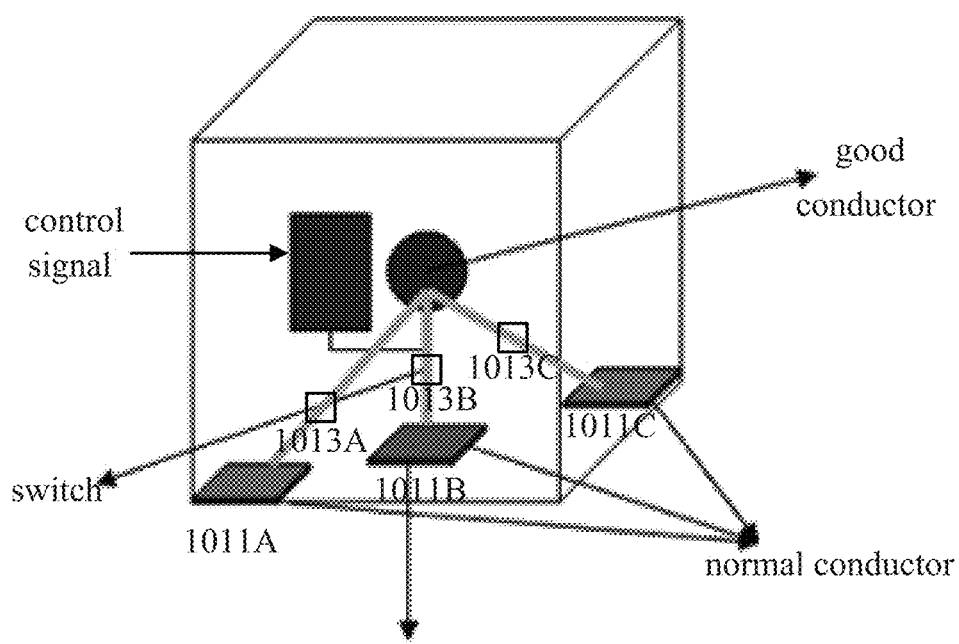
FIG. 2 is a diagram of configuration of a programmable electric conductive unit in the electronic apparatus according to the first embodiment of the present invention.

In particular, as shown in FIG. 2, the programmable electric conductive unit 101 includes three normal conductors 1011A-1011C, one good conductor 1012, three switches 1013A-1013C, the switches turn on the good conductor or the normal conductor according to the control signal so as to switch between the good conductor mode and the normal conductor mode.

It should be noted that in case that there is no need to be distinguished particularly, the normal conductors 1011A-1011C are collectively referred to as 1011, and the switches 1013A-1013C are collectively referred to as 1013.

The normal conductor 1011 is for example a conductive rubber, of course it can be other type of conductive material so long as it is a conductor with normal electric conductive performance. Only three conductive rubbers are shown in FIG. 2, however, it should be understood that the number of the conductive rubber may be any number according to type and model of the apparatus.

The good conductor 1012 is for example a metallic good conductor, of course it can be other type of conductive material as long as it is a conductor with good electric conductive performance. Only one metallic good conductor is shown in FIG. 2, however, it should understand that the number of the metallic good conductor may be any number according to type and model of the apparatus.

The switch 1013 is for example a controllably conductive diode, and it can be any other type of switch as long as it can be controlled to be turned on or off according to the control signal. The switch 1013 is connected between the normal conductor 1011 and the good conductor 1012, and is turned on or turned off by receiving the control signal sent from the control unit 102. When the switch 1013 is turned on, the programmable electric conductive unit 101 operates in the good conductor mode, and when the switch 1013 is turned off, the programmable electric conductive unit 101 operates in the normal conductor mode.

As shown in FIGS. 3A and 3B, FIG. 3A illustrates a back view of the electronic apparatus according to the first embodiment of the present invention, and FIG. 3B illustrates a front view of the electronic apparatus according to the first embodiment of the present invention.

As shown in FIG. 3A, the three conductive rubber blocks adhere to three positions at upper-left, upper-right and lower-right of the electronic apparatus. It should be noted that for each electronic apparatus, number and position of adhering of the conductive rubber blocks are fixed, and such apparatus information can be stored in a storing unit of the electronic apparatus.

The control unit 102 can generate the control signal having a predetermined frequency according to a predetermined modulation mode, and send the control signal to the programmable electric conductive unit 101. In particular, the control unit 102 sends the control signal to the switch 1013, so as to control the switch 1013 to be turned on or off.

As described above, when the switch 1013 is turned on, the programmable electric conductive unit 101 is switched to the good conductor mode, and the capacitive touch control screen explodes point immediately at this time, and input signal is detected, when the switch 1013 is turned off, the programmable electric conductive unit 101 is switched to the normal conductor mode, and the capacitive touch control screen does not respond at this time, and the input signal is not detected. Therefore, the control unit 102 can carry out coded modulation on the predetermined information to be transmitted by controlling the respective switches 1013 to be turned on and off, to generate the coded predetermined information. The coded modulating the information can be conducted in the common ways in the prior art, and it is not described in detail here.

The feedback information receiving unit 103 can receive the feedback information transmitted from the second electronic apparatus, and the feedback information is transmitted in response to reception of the predetermined information.

The feedback information receiving unit 103 is for example an image acquiring unit (for example, a camera) or an acoustic sensor (for example, a microphone) or other sensor (for example, an optical sensor). After contacting with the second electronic apparatus and sending the predetermined information to the second electronic apparatus, the feedback information receiving unit 103 can receive information fed back by the second electronic apparatus, for confirming whether the interaction with the second electronic apparatus is successful, or the like.

Hereinafter, the operation of the electronic apparatus 100 is described.

First, the electronic apparatus 100 is made to contact with the second electronic apparatus. At this time, the control unit 102 sends the control signal to the programmable electric conductive unit 101, to control the respective switches 1013 in the programmable electric conductive unit 101 to be turned on or off, so as to transfer the predetermined information to the second electronic apparatus.

The predetermined information can include apparatus information related to the electronic apparatus. For example, the apparatus information includes one or more of the following: an apparatus identifier, type and model information of the apparatus, type and model information of the feedback information receiving unit, and/or the relative position information of the programmable electric conductive unit and the feedback information receiving unit.

In this embodiment, for example, the apparatus information can include the apparatus identifier for determining the electronic apparatus 100 uniquely, for example, a serial number (SN) of the mobile phone, of course, it can be any other identifier as long as it can determine the electronic apparatus exclusively. Further, for example, the apparatus information may include information indicating that the electronic apparatus is a mobile phone apparatus and the type is K860 of cheer phone of Lenovo. Further, the apparatus information may include information indicating the type and model of the feedback information receiving unit, for example, indicating that the feedback information receiving unit is a camera, and the model thereof is C170 of Logitech, or indicating that the feedback information receiving unit is a microphone, and the model thereof is TAK-STAR PCM5550, and so on. Further, for example, the apparatus information may include information indicating the relative position of the programmable electric conductive unit and the feedback information receiving unit, for example, the distance of the camera from the rubber electric conductive block at the upper left corner is 1 cm, the distance thereof from the rubber electric conductive block at the upper right corner is 2 cm and the distance from the rubber electric conductive block at the lower right corner is 3 cm.

Further, the relative position of the programmable electric conductive unit and the feedback information receiving unit may be fixed. That is, in the ex-factory electronic apparatus of each model, the relative position of the camera and the conductive rubber block is fixed. Of course, the positions of the camera or the conductive rubber block can be adjusted as necessary.

Then, the feedback information receiving unit receives the feedback information transmitted from the second electronic apparatus, and the feedback information is transmitted in response to the reception of the predetermined information.

For example, in one embodiment, the feedback information receiving unit is an image acquiring unit, and the feedback information includes visual information, for example, one or more of the following: color, graph, image and character. That is, the second electronic apparatus displays a predetermined color, graph, image or character in response to the reception of the predetermined information.

For example, in another embodiment, the feedback information receiving unit is an acoustic sensor, and the feedback information includes voice information. That is, the second electronic apparatus displays predetermined voice information, for example, beep or dialog in response to the reception of the predetermined information.

Then, the feedback information receiving unit analyzes the received feedback information to confirm whether the second electronic apparatus successfully receive the predetermined information.

In one embodiment, when the visual information is a color, successful reception of the predetermined information is indicated by a first color, and unsuccessful reception of the predetermined information is indicated by a second color. For example, red is displayed to indicate the successful reception of the predetermined information, and green is displayed to indicate the unsuccessful reception of the predetermined information.

In one embodiment, when the visual information is a graph, successful reception of the predetermined information is indicated by a first predetermined graph, and unsuccessful reception of the predetermined information is indicated by a second predetermined graph. For example, a circular shape is displayed to indicate the successful reception of the predetermined information, and a triangular shape is displayed to indicate the unsuccessful reception of the predetermined information.

In one embodiment, when the visual information is an image, successful reception of the predetermined information is indicated by a first predetermined image, and unsuccessful reception of the predetermined information is indicated by a second predetermined image. For example, a display picture of the first electronic apparatus is displayed to indicate successful reception of the predetermined information, and a blank picture is displayed to indicate unsuccessful reception of the predetermined information.

In one embodiment, when the visual information is a character, by executing a recognition process on the character in the feedback information, successful or unsuccessful reception of the predetermined information is confirmed according to the content of the recognized character. For example, "successful reception" is displayed to indicate successful reception of the predetermined information, and "failed reception" is displayed to indicate unsuccessful reception of the predetermined information.

In another embodiment, when the feedback information is voice information, successful or unsuccessful reception of the predetermined informational is confirmed according to the content of the recognized voice. For example, successful reception of the predetermined information is indicated by one sound of short rang, and unsuccessful reception of the predetermined information is indicated by one sound of long rang. Or, successful reception of the predetermined information is indicated by a voice prompt of "successful reception", and unsuccessful reception of the predetermined information is indicated by a voice prompt of "failed reception".

Then, after confirming that the second electronic apparatus has received the predetermined information sent by the electronic apparatus 100 successfully according to the result of analysis, transmission of additional predetermined information can be executed. When it is determined that the electronic apparatus has not received the predetermined information sent by the electronic apparatus 100 successfully according to the result of analysis, retransmission of the predetermined information can be executed.

The advantage of the electronic apparatus 100 according to the first embodiment of the present invention is that additional data line or wireless connection module is not required between the electronic apparatus 100 and the second electronic apparatus to carry out communication, so as to provide more interactive modes. Further, the second electronic apparatus can execute corresponding operation according to the received predetermined information, and provide the feedback information. The electronic apparatus 100 then determines to transfer additional predetermined information or retransmit the predetermined information according to the feedback information of the second electronic apparatus, so as to ensure reliability of the communication effectively.

Therefore, the electronic apparatus according to the first embodiment of the present invention can interact with the capacitive touch control screen effectively according to the characteristic of the capacitive touch control screen so as to give the user a good usage experience.

The Second Embodiment

FIG. 4 is a block diagram of functional configuration of an electronic apparatus 200 according to the second embodiment of the present invention. In this embodiment, it is described by taking the tablet computer being the electronic apparatus 200 as an example, it should be understood that the electronic apparatus 200 may be any type of electronic apparatus. The second electronic apparatus 200 corresponds to the second electronic apparatus in the first embodiment.

As shown in FIG. 4, the electronic apparatus 200 according to the second embodiment of the present invention includes:

A touch control display unit 201 configured to receive predetermined information inputted from the second electronic apparatus when it contacts with the second electronic apparatus, the second electronic apparatus transmitting the predetermined information by switching between a good conductor mode and a normal conductor mode;

A control unit 202 configured to generate feedback information according to the predetermined information, and control the touch control display unit to provide the feedback information to the second electronic apparatus.

The touch control display unit 201 is for example a capacitive touch control screen. The second electronic apparatus in the present embodiment is for example the electronic apparatus 100 in the first embodiment.

Further, the predetermined information includes apparatus information related to the second electronic apparatus, the apparatus information includes one or more of the following: an apparatus identifier, type and model information of the apparatus, type and model information of the feedback information receiving unit, and/or the relative position information of the programmable electric conductive unit and the feedback information receiving unit.

Also, the control unit 202 is further configured to detect a position of a contact point contacting with the second electronic apparatus, and determine a position of providing the feedback information to the second electronic apparatus according to the result of detection and the relative position information of the programmable electric conductive unit and the feedback information receiving unit included in the apparatus information. For example, the control unit 202 detects contact position 103A, 103B and 103C with the second electronic apparatus (i.e., the three positions of contact points of the electronic apparatus 100), and determine the position where the camera is as the position of the feedback information according to the relative position of the conductive rubber block and the camera of the second electronic apparatus indicated in the received apparatus information, that is, the distance of the camera from the rubber electric conductive block at the upper left corner being 1 cm, the distance of the camera from the rubber electric conductive block at the upper right corner being 2 cm, and the distance of the camera from the rubber electric conductive block at the lower right corner being 3 cm.

The feedback information is same as the feedback information described in the first embodiment, and the detailed description thereof is omitted here.

Figure 5:
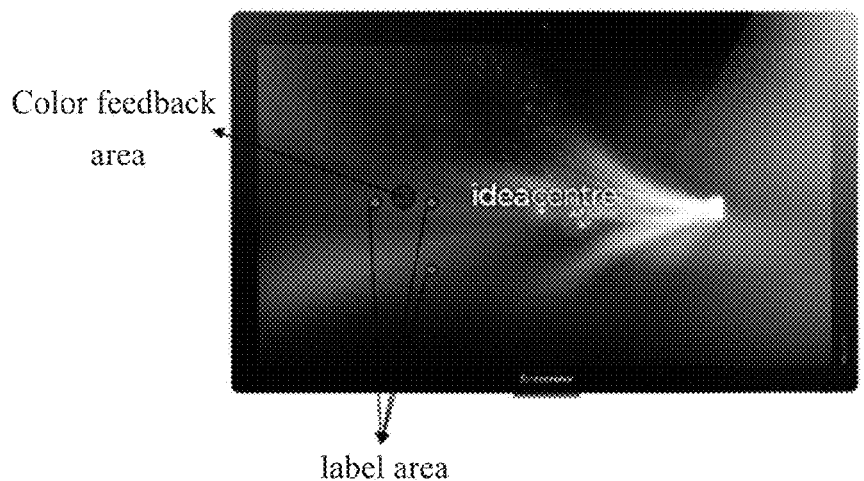
FIG. 5 is a diagram of effect of the electronic apparatus according to the second embodiment of the present invention.

As shown in FIG. 5, when the control unit receives the predetermined information from the second electronic apparatus, a predetermined color is displayed as the feedback information at a position corresponding to the camera.

Therefore, the electronic apparatus according to the second embodiment of the present invention can interact with the electronic apparatus effectively according to the characteristic of the capacitive touch control screen so as to give the user a good usage experience.

The Third Embodiment

Figure 6:
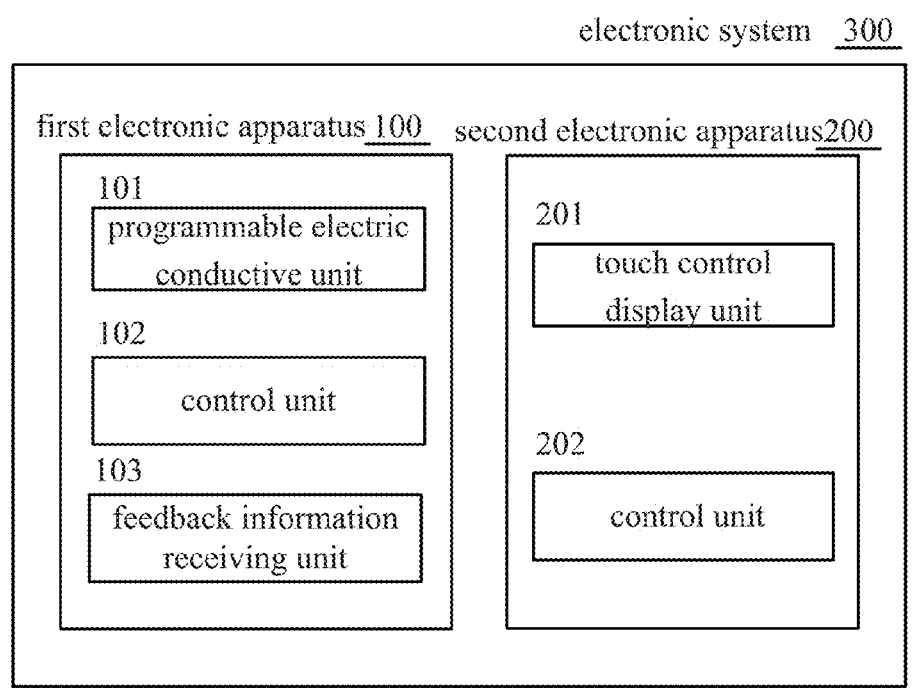
FIG. 6 is a functional block diagram of an electronic system according to a third embodiment of the present invention.

FIG. 6 is a block diagram of functional configuration of an electronic system 300 according to the third embodiment of the present invention. In this embodiment, it is described by taking the mobile phone being the electronic apparatus 100 and the tablet computer being the electronic apparatus 200 as example, it should be understood that the electronic apparatuses 100 and 200 may be any type of electronic apparatuses.

The electronic system 300 includes the electronic apparatuses 100 and 200.

The first electronic apparatus 100 includes:

At least one programmable electric conductive unit 101 configured to switch between a good conductor mode and a normal conductor mode according to a control signal when it contacts with a second electronic apparatus 200, so as to transmit predetermined information to the second electronic apparatus 200 contacting with the first electronic apparatus 100;

A control unit 102 configured to generate the control signal having a preset frequency;

A feedback information receiving unit 103 configured to receive the feedback information transmitted from the second electronic apparatus 200, the feedback information being transmitted in response to the reception of the predetermined information.

The second electronic apparatus 200 includes:

A touch control display unit 201 configured to receive the predetermined information inputted from the first electronic apparatus 100 when it contacts with the first electronic apparatus 100;

A control unit 202 configured to generate feedback information according to the predetermined information, and control the touch control display unit to provide the feedback information to the first electronic apparatus 100.

The electronic apparatus 100 corresponds to the electronic apparatus 100 in the first embodiment, and the electronic apparatus 200 corresponds to the electronic apparatus 200 in the second embodiment, the detailed description thereof is omitted here.

Therefore, the electronic system according to the third embodiment of the present invention can interact between the respective electronic apparatuses effectively according to the characteristic of the capacitive touch control screen so as to give the user a good usage experience.

It should be noted that, the above embodiments are only used as examples, and the present invention is not limited to such examples, but various kinds of modifications can be carried out thereto.

It should be indicated that, in the specification, terms such as "comprise", "include" and any other variation thereof intend to cover nonexclusive inclusion so that the procedure, the method, the product or the equipment including a series of elements not only include these elements, but also include other elements which are not listed explicitly, or also include inherent elements of these procedure, method, product or equipment. In case that there is no more limitation, the element defined by statement "including one . . . " does not exclude there is another same element in the procedure, method, article or apparatus including the element.

Finally, it should be noted that, a series of processes described above not only comprise processes executed chronologically in order mentioned here, but also comprise processes executed in parallel or individually but not chronologically.

With the description of the above implementation mode, those skilled in the art can clearly understand that the present invention can be implemented by means of software plus necessary hardware platform, of course, it can be implemented by hardware totally. Based on such understanding, all or part of the technical solution of the present invention contributing to the prior art can be embodied by a form of a software product, the computer software product can be stored in a storage medium, such as ROM (read-only memory)/RAM (random access memory), magnetic disc, optical disk or the like, it comprises some instructions to cause a computer equipment (it may be a personal computer, a server or a network equipment or the like) to execute the method according to the respective embodiments or certain part of the embodiments of the present invention.

The present invention is described above in detail, the principle and implementation mode of the present invention are explained by applying some specific example in the specification, the above explanation of the embodiments is only for helping to understand the method of the present invention and the essential spirit thereof, and, at the same time, for those skilled in the art, they can modify the specific implementation mode and application area based on the idea of the present invention, thus, in summary, the content of this specification should not be understood as a limitation to the present invention.

The invention claimed is:

1. An electronic apparatus, comprising:
   at least one programmable electric conductive unit configured to switch between a good conductor mode and a normal conductor mode according to a control signal when it contacts with a second electronic apparatus, so as to transmit predetermined information to the second electronic apparatus contacting with the electronic apparatus;
   a control unit configured to generate the control signal having a preset frequency; and
   a feedback information receiving unit configured to receive feedback information transmitted from the second electronic apparatus, the feedback information being transmitted in response to reception of the predetermined information.

2. The electronic apparatus according to claim 1, wherein, the at least one programmable electric conductive unit comprises:
   a good conductor;
   a normal conductor configured to contact with the second electronic apparatus;
   a switch configured to turn on the good conductor or the normal conductor according to the control signal so as to switch between the good conductor mode and the normal conductor mode.

3. The electronic apparatus according to claim 1, wherein, the predetermined information includes apparatus information related to the electronic apparatus, the apparatus information including one or more of the following:
   an apparatus identifier;
   type and model information of the apparatus;
   type and model information of the feedback information receiving unit; and/or
   relative position information of the programmable electric conductive unit and the feedback information receiving unit.

4. The electronic apparatus according to claim 3, wherein, a relative position of the programmable electric conductive unit and the feedback information receiving unit is fixed.

5. The electronic apparatus according to claim 1, wherein, the feedback information receiving unit is further configured to analyze the received feedback information to confirm whether the second electronic apparatus receives the predetermined information successfully.

6. The electronic apparatus according to claim 5, wherein, the feedback information receiving unit is an image acquiring unit, and the feedback information includes visual information.

7. The electronic apparatus according to claim 6, wherein when the visual information is a color, successful reception of the predetermined information is indicated by a first color, and unsuccessful reception of the predetermined information is indicated by a second color; or when the visual information is a graph, successful reception of the predetermined information is indicated by a first graph, and unsuccessful reception of the predetermined information is indicated by a second graph; or when the visual information is an image, successful reception of the predetermined information is indicated by a first predetermined image, and unsuccessful reception of the predetermined information is indicated by a second predetermined image; or when the visual information is a character, by executing a recognition process on the character in the feedback information, successful or unsuccessful reception of the predetermined information is confirmed according to content of the recognized character.

8. The electronic apparatus according to claim 5, wherein, the feedback information receiving unit is an acoustic sensor, and the feedback information includes voice information.

9. The electronic apparatus according to claim 8, wherein, by executing a recognition process on the voice information, successful or unsuccessful reception of the predetermined information is confirmed according to the recognized content of the voice.

10. An electronic apparatus, comprising:
a touch control display unit configured to receive predetermined information inputted from a second electronic apparatus when it contacts with the second electronic apparatus, the second electronic apparatus comprising at least one programmable electric conductive unit configured to switch between a good conductor mode and a normal conductor mode according to a control signal when it contacts with the electronic apparatus, so as to transmit the predetermined information to the electronic apparatus contacting with the second electronic apparatus; and
a control unit configured to generate feedback information according to the predetermined information, and control the touch control display unit to provide the feedback information to the second electronic apparatus.

11. The electronic apparatus according to claim 10, wherein, the predetermined information includes apparatus information related to the second electronic apparatus, the apparatus information including one or more of the following:

an apparatus identifier;
type and model information of the apparatus;
type and model information of a feedback information receiving unit; and/or
relative position information of a programmable electric conductive unit and the feedback information receiving unit.

12. The electronic apparatus according to claim 11, wherein, the control unit is further configured to detect a position of a contact point contacting with the second electronic apparatus, and determine a position of providing the feedback information to the second electronic apparatus according to a result of detection and the relative position information of the programmable electric conductive unit and the feedback information receiving unit included in the apparatus information.

13. The electronic apparatus according to claim 10, wherein, the touch control display unit is a capacitive touch control display unit.

14. An electronic system, comprising:
a first electronic apparatus, including:
at least one programmable electric conductive unit configured to switch between a good conductor mode and a normal conductor mode according to a control signal when it contacts with a second electronic apparatus, so as to transmit predetermined information to the second electronic apparatus contacting with the first electronic apparatus;
a control unit configured to generate the control signal having a preset frequency; and
a feedback information receiving unit configured to receive feedback information transmitted from the second electronic apparatus, the feedback information being transmitted in response to reception of the predetermined information;
the second electronic apparatus, comprising:
a touch control display unit configured to receive the predetermined information inputted from the first electronic apparatus when it contacts with the first electronic apparatus; and
a control unit configured to generate feedback information according to the predetermined information, and control the touch control display unit to provide the feedback information to the first electronic apparatus.

* * * * *